(12) United States Patent
Brown

(10) Patent No.: US 11,273,792 B2
(45) Date of Patent: Mar. 15, 2022

(54) VEHICLE SECURITY ALARM ASSEMBLY

(71) Applicant: Brazie Brown, Birmingham, AL (US)

(72) Inventor: Brazie Brown, Birmingham, AL (US)

(*) Notice: Subject to any disclaimer, the term of this patent is extended or adjusted under 35 U.S.C. 154(b) by 78 days.

(21) Appl. No.: 16/904,093

(22) Filed: Jun. 17, 2020

(65) Prior Publication Data

US 2021/0394711 A1 Dec. 23, 2021

(51) Int. Cl.
| | | |
|---|---|---|
| *B60R 25/102* | (2013.01) | |
| *B60R 25/10* | (2013.01) | |
| *B60R 25/34* | (2013.01) | |
| *G06K 9/00* | (2006.01) | |
| *B60R 1/04* | (2006.01) | |

(52) U.S. Cl.
CPC .............. *B60R 25/102* (2013.01); *B60R 1/04* (2013.01); *B60R 25/1001* (2013.01); *B60R 25/34* (2013.01); *G06K 9/00838* (2013.01); *B60R 2025/1016* (2013.01); *B60R 2300/8013* (2013.01); *B60R 2325/205* (2013.01)

(58) Field of Classification Search
CPC ...... B60R 2025/1016; B60R 2325/304; B60R 25/04; B60R 25/10; B60R 25/1003; B60R 25/1004; B60R 25/104; B60R 25/102; B60R 1/04; B60R 25/1001; B60R 25/34; B60R 2300/8013; B60R 2325/205; G08B 13/2491; G08B 23/00; G06K 9/00838
See application file for complete search history.

(56) References Cited

U.S. PATENT DOCUMENTS

| | | | |
|---|---|---|---|
| 4,987,402 A * | 1/1991 | Nykerk | B60R 25/04 |
| | | | 340/309.16 |
| 5,319,350 A | 6/1994 | DeMarco | |
| 6,002,326 A | 12/1999 | Turner | |
| 9,747,795 B1 | 8/2017 | Espinosa | |
| 9,809,196 B1 | 11/2017 | Penilla | |
| 10,328,896 B2 | 6/2019 | Salter | |
| 2009/0284598 A1* | 11/2009 | Busch | B60R 1/12 |
| | | | 348/148 |
| 2010/0214132 A1 | 8/2010 | Palazzo | |
| 2011/0227712 A1 | 9/2011 | Atteck | |
| 2015/0085121 A1* | 3/2015 | Englander | H04N 7/183 |
| | | | 348/148 |

FOREIGN PATENT DOCUMENTS

| | | |
|---|---|---|
| EP | 3293051 | 9/2017 |
| WO | WO9105682 | 5/1991 |

* cited by examiner

*Primary Examiner* — Omeed Alizada

(57) ABSTRACT

A vehicle security alarm assembly includes a plurality of window sensors coupled to windows of a vehicle and plurality of handle sensors coupled to door handles of the vehicle. A motion sensing array is coupled to the vehicle to detect motion proximate the vehicle. Each of the window sensors, the handle sensors and the motion sensing array is in communication with the alarm system of the vehicle to selectively trigger the alarm system. A surveillance unit is mounted to a rear view mirror of the vehicle thereby facilitating the surveillance unit to surveil a back seat of the vehicle. A personal electronic device is included that is in communication with the alarm system for alerting an owner of the vehicle when the alarm system is triggered.

10 Claims, 4 Drawing Sheets

VEHICLE SECURITY ALARM ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to alarm devices and more particularly pertains to a new alarm device for remotely alerting a user to a potential theft of a vehicle.

(2) Description of Related Art Including Information Disclosed Under 37 CFR 1.97 and 1.98

The prior art relates to alarm devices including a variety of an auto alarms that have any manner of a proximity sensor a verbal warning for warning a person approaching a vehicle to stay away. Additionally, the prior art discloses a variety of proximity alarms that alerts an occupant of a parked vehicle that a person is approaching the vehicle. The prior art further discloses a variety of alarm devices that include video surveillance for detecting a person approaching a vehicle and an audible alarm that is triggered when a person approaches the vehicle. The prior art also discloses a vehicle alarm device that records video footage of a person approaching a vehicle for subsequently analysis by law enforcement.

BRIEF SUMMARY OF THE INVENTION

An embodiment of the disclosure meets the needs presented above by generally comprising a plurality of window sensors coupled to windows of a vehicle and plurality of handle sensors coupled to door handles of the vehicle. A motion sensing array is coupled to the vehicle to detect motion proximate the vehicle. Each of the window sensors, the handle sensors and the motion sensing array is in communication with the alarm system of the vehicle to selectively trigger the alarm system. A surveillance unit is mounted to a rear view mirror of the vehicle thereby facilitating the surveillance unit to surveil a back seat of the vehicle. A personal electronic device is included that is in communication with the alarm system for alerting an owner of the vehicle when the alarm system is triggered.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
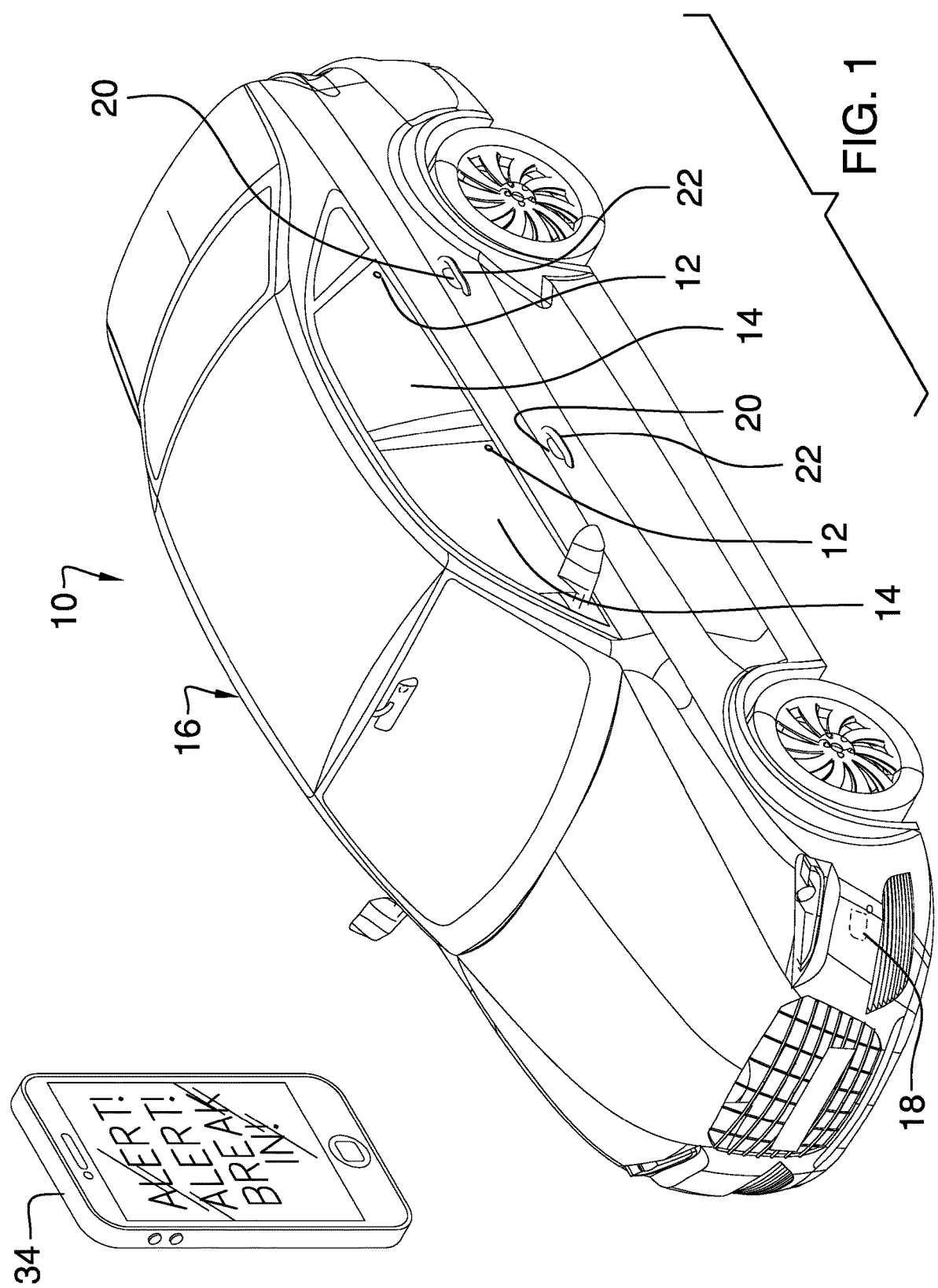
FIG. 1 is a perspective view of a vehicle security alarm assembly according to an embodiment of the disclosure.
Figure 2:
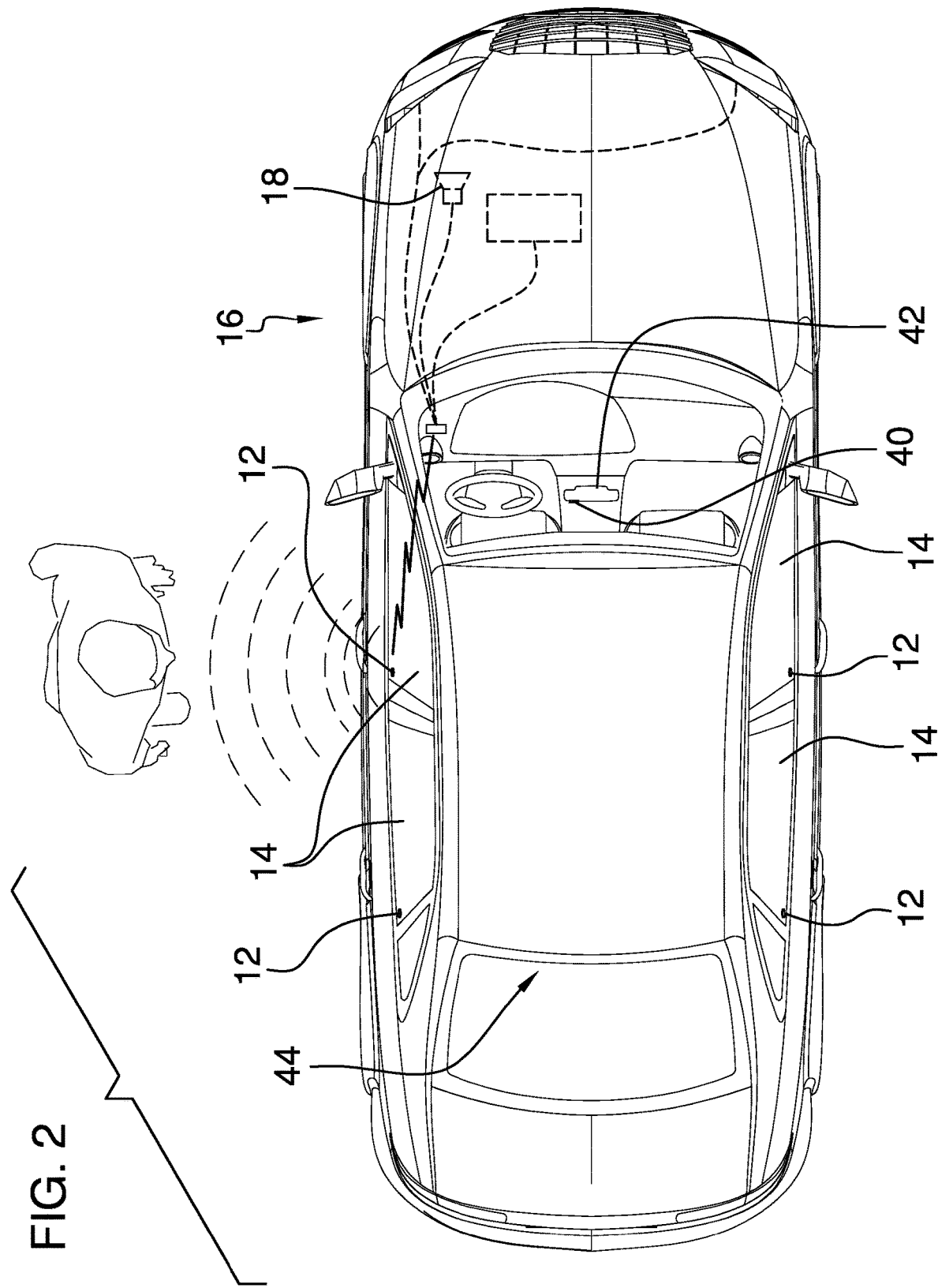
FIG. 2 is a perspective in-use view of an embodiment of the disclosure.
Figure 3:
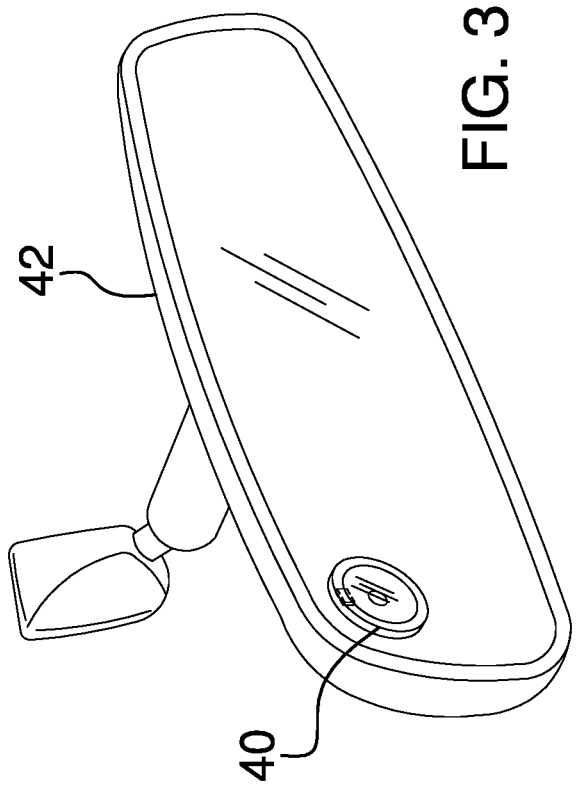
FIG. 3 is a perspective view of a rear view mirror and a surveillance unit of an embodiment of the disclosure.
Figure 4:
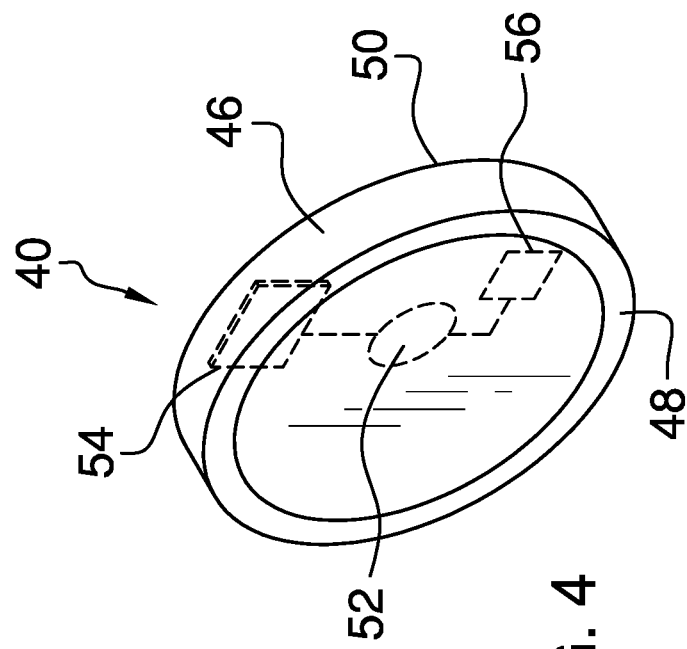
FIG. 4 is a perspective view of a surveillance unit of an embodiment of the disclosure.
Figure 5:
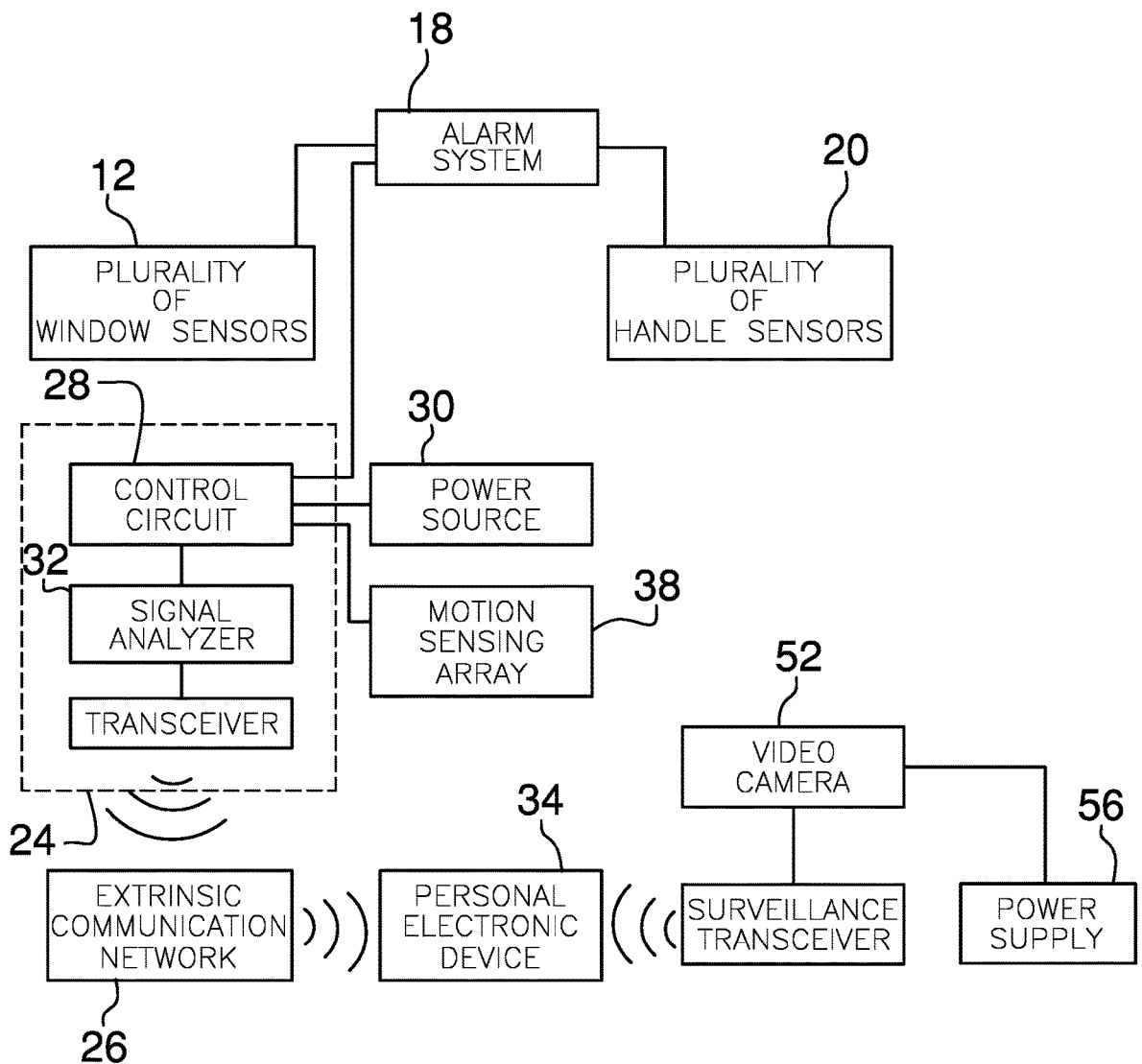
FIG. 5 is a schematic view of an embodiment of the disclosure.

With reference now to the drawings, and in particular to FIGS. 1 through 5 thereof, a new alarm device embodying the principles and concepts of an embodiment of the disclosure and generally designated by the reference numeral 10 will be described.

As best illustrated in FIGS. 1 through 5, the vehicle security alarm assembly 10 generally comprises a plurality of window sensors 12 that is each coupled to a respective one of a plurality of windows 14 on a vehicle 16. In this way each of the window sensors 12 can detect impact on the respective window 14. Each of the window sensors 12 is in electrical communication with an alarm system 18 of the vehicle 16 thereby triggering the alarm system 18 when any of the window sensors 12 senses an impact on the respective window 14. Each of the window sensors 12 may comprise an electronic impact sensor or the like. Additionally, the vehicle 16 may be a passenger vehicle, a cargo vehicle or any other motorized vehicle that is driven on public roadways.

A plurality of handle sensors 20 is each coupled to a respective one of a plurality of door handles 22 on the vehicle 16. In this way each of the handle sensors 20 can detect when the respective handle 22 is manipulated. Each of the handle sensors 20 is in electrical communication with the alarm system 18 of the vehicle 16 thereby triggering the alarm system 18 when any of the handle sensors 20 senses that the respective door handle 22 has been manipulated. Each of the handle sensors 20 may comprise an electronic touch sensor, an electronic motion sensor or any other type of sensor that can sense when the door handles 22 are manipulated.

A communication unit 24 is provided and the communication unit 24 is coupled to the vehicle 16. The communication unit 24 is in electrical communication with the alarm system 18 of the vehicle 16 and the communication unit 24 broadcasts an alert signal when the alarm system 18 is triggered. Additionally, the communication unit 24 is in remote communication with an extrinsic communication network 26 thereby facilitating the communication unit 24 to notify an owner of the vehicle 16 that the alarm system 18 has been triggered. The extrinsic communication network 26 may comprise a cellular phone network, a wireless internet router or any other type of wireless communication network.

The communication unit 24 comprises a control circuit 28 that is coupled to the vehicle 16 and the control circuit 28 is electrically coupled to a power source 30 comprising an electrical system of the vehicle 16. Additionally, the control circuit 28 is in electrical communication with the alarm system 18. Each of the window sensors 12 is electrically coupled to the control circuit 28 and each of the handle sensors 20 is electrically coupled to the control circuit 28. The control circuit 28 receives an alarm input when the alarm system 18 of the vehicle 16 is triggered. The communication unit 24 includes a signal analyzer 32 that is coupled to the vehicle 16 and the signal analyzer 32 is electrically coupled to the control circuit 28.

The communication unit 24 includes a personal electronic device 34 is included that is carried by the owner of the vehicle 16. Additionally the personal electronic device 34 is in remote communication with the extrinsic communication network 26. The personal electronic device 34 may comprise a smart phone, an electronic tablet or any other similar device employed for remote communication. The communication unit 24 includes a transceiver 36 that is coupled to the vehicle 16 and the transceiver 36 is electrically coupled to the control circuit 28.

The transceiver 36 is turned on when the control circuit 28 receives the alarm input. Moreover, the transceiver 36 broadcasts the alert signal to the personal electronic device 34 when the transceiver 36 is turned on. In this way the personal electronic device 34 can notify the owner of the vehicle 16 to a potential theft. The transceiver 36 may comprise a radio frequency transceiver or the like and the transceiver 36 may employ Bluetooth communication protocols.

A motion sensing array 38 is coupled to the vehicle 16 to detect motion proximate the vehicle 16 and the motion sensing array 38 is in communication with the alarm system 18 of the vehicle 16. Moreover, the motion sensing array 38 triggers the alarm system 18 when the motion sensing array 38 senses motion within a predetermined trigger distance of the vehicle 16. In this way the motion sensing array 38 can deter a potential thief from attempting to forcibly enter the vehicle 16.

The motion sensing array 38 is electrically coupled to the control circuit 28 and the motion sensing array 38 communicates a motion signal to the control circuit 28. The motion sensing array 38 increases an intensity of the motion signal in inverse proportion to the distance between the potential thief and the vehicle 16 once the potential thief moves within the predetermined trigger distance of the vehicle 16. The trigger distance may be a distance of not more than approximately 5.0 feet of the vehicle 16. The signal analyzer 32 analyzes the motion signal communicated by the motion sensing array 38. Moreover, the signal analyzer 32 increases an audible volume of the alert system in direct proportion to the intensity of the motion signal. The alarm system 18 may be in wireless communication with a key fob for the vehicle 16 such that the alarm system 18 is disabled with the owner of the vehicle 16 approaches the vehicle 16 or manipulates the door handles 22.

A surveillance unit 40 is mounted to a rear view mirror 42 of the vehicle 16 thereby facilitating the surveillance unit 40 to surveil a back seat 44 of the vehicle 16. In this way the surveillance unit 40 can monitor a child or the like that sitting in the back seat 44. The surveillance unit 40 comprises a housing 46 that has a front wall 48 and a back wall 50, and the back wall 50 is bonded to the rear view mirror 42 having the front wall 48 facing the back seat 44. The surveillance unit 40 includes a video camera 52 that is coupled to the front wall 48 to capture footage of the back seat 44.

The surveillance unit 40 includes a surveillance transceiver 54 that is positioned in the housing 46. The surveillance transceiver 54 is in remote communication with the personal electronic device 34 to broadcast the footage of the back seat 44 to the owner of the vehicle 16. The surveillance transceiver 54 may comprise a radio frequency transceiver or the like and the surveillance transceiver 54 may employ Bluetooth communication protocols. The surveillance unit 40 includes a power supply 56 positioned in the housing 46. The power supply is electrically coupled to the video camera 52 and the surveillance transceiver 54, and the power supply 56 comprises at least one battery.

In use, the alarm system 18 is triggered when the motion sensing array 38 senses that a person has moved within the trigger distance of the vehicle 16. Additionally, the audible volume of the alarm system 18 increases as the person moves closer to the vehicle 16. In this way a potential thief can be deterred from forcibly entering the vehicle 16. The alarm system 18 is triggered when any of the window sensors 12 senses a window 14 has been struck and when any other handle sensors 20 senses that a door handle 22 has been manipulated. Additionally, the transceiver 36 broadcasts the alert signal to the personal electronic device 34 to alert the owner of the vehicle 16 to the potential theft. In this way the owner of the vehicle 16 can immediately notify authorities to respond to the potential theft.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle security alarm assembly for alerting a vehicle owner to a theft attempt, said assembly comprising:
   a plurality of window sensors, each of said window sensors being coupled to a respective one of a plurality of windows on a vehicle wherein each of said window sensors is configured to detect impact on the respective window, each of said window sensors being in electrical communication with an alarm system of the vehicle thereby triggering the alarm system when any of said window sensors senses an impact on the respective window;
   a plurality of handle sensors, each of said handle sensors being coupled to a respective one of a plurality of door handles on the vehicle wherein each of said handle sensors is configured to detect when the respective handle is manipulated, each of said handle sensors being in electrical communication with the alarm system of the vehicle thereby triggering the alarm system when any of said handle sensors senses that the respective door handle has been manipulated;
   a communication unit being coupled to the vehicle, said communication unit being in electrical communication with the alarm system of the vehicle, said communication unit broadcasting an alert signal when the alarm system is triggered, said communication unit being in remote communication with an extrinsic communication network thereby facilitating said communication unit to notify an owner of the vehicle that the alarm system has been triggered;
   a motion sensing array being coupled to the vehicle wherein said motion sensing array is configured to detect motion proximate the vehicle, said motion sensing array being in communication with the alarm system of the vehicle, said motion sensing array triggering the alarm system when said motion sensing array senses motion within a predetermined trigger distance of the vehicle wherein said motion sensing array is configured to deter a potential thief from attempting to forcibly enter the vehicle; and
   a surveillance unit being mounted to a rear view mirror of the vehicle thereby facilitating said surveillance unit to surveil a back seat of the vehicle wherein said surveillance unit is configured to monitor a child sitting in the back seat.

2. The assembly according to claim 1, wherein said communication unit comprises a control circuit being coupled to the vehicle, said control circuit being electrically coupled to a power source comprising an electrical system of the vehicle, said control circuit being in electrical communication with the alarm system, each of said window sensors being electrically coupled to said control circuit, each of said handle sensors being electrically coupled to said control circuit, said control circuit receiving an alarm input when the alarm system of the vehicle is triggered.

3. The assembly according to claim 2, wherein said communication unit includes a signal analyzer being coupled to the vehicle, said signal analyzer being electrically coupled to said control circuit.

4. The assembly according to claim 2, wherein said communication unit includes:
   a personal electronic device being carried by the owner of the vehicle, said personal electronic device being in remote communication with the extrinsic communication network; and
   a transceiver being coupled to the vehicle, said transceiver being electrically coupled to said control circuit, said transceiver being turned on when said control circuit receives said alarm input, said transceiver broadcasting said alert signal to said personal electronic device when said transceiver is turned on wherein said personal electronic device is configured to notify the owner of the vehicle to a potential theft.

5. The assembly according to claim 3, wherein said motion sensing array is electrically coupled to said control circuit, said motion sensing array communicating a motion signal to said control circuit, said motion sensing array increasing an intensity of said motion signal in inverse proportion to the distance between the potential thief and the vehicle once the potential thief moves within said predetermined trigger distance of the vehicle, said signal analyzer analyzing said motion signal communicated by said motion sensing array, said signal analyzer increasing an audible volume of the alert system in direct proportion to the intensity of said motion signal.

6. The assembly according to claim 1, wherein said surveillance unit comprises a housing having a front wall and a back wall, said back wall being bonded to the rear view mirror having said front wall facing the back seat.

7. The assembly according to claim 6, wherein said surveillance unit includes a video camera being coupled to said front wall wherein said video camera is configured to capture footage of the back seat.

8. The assembly according to claim 7, wherein said surveillance unit includes a surveillance transceiver being positioned in said housing, said surveillance transceiver being in remote communication with the personal electronic device wherein said surveillance transceiver is configured to broadcast the footage of the back seat to the owner of the vehicle.

9. The assembly according to claim 8, wherein said surveillance unit includes a power supply being positioned in said housing, said power supply being electrically coupled to said video camera and said surveillance transceiver, said power supply comprising at least one battery.

10. A vehicle security alarm assembly for alerting a vehicle owner to a theft attempt, said assembly comprising:
    a plurality of window sensors, each of said window sensors being coupled to a respective one of a plurality of windows on a vehicle wherein each of said window sensors is configured to detect impact on the respective window, each of said window sensors being in electrical communication with an alarm system of the vehicle thereby triggering the alarm system when any of said window sensors senses an impact on the respective window;
    a plurality of handle sensors, each of said handle sensors being coupled to a respective one of a plurality of door handles on the vehicle wherein each of said handle sensors is configured to detect when the respective handle is manipulated, each of said handle sensors being in electrical communication with the alarm system of the vehicle thereby triggering the alarm system when any of said handle sensors senses that the respective door handle has been manipulated;
    a communication unit being coupled to the vehicle, said communication unit being in electrical communication with the alarm system of the vehicle, said communication unit broadcasting an alert signal when the alarm system is triggered, said communication unit being in remote communication with an extrinsic communication network thereby facilitating said communication unit to notify an owner of the vehicle that the alarm system has been triggered, said communication unit comprising:
- a control circuit being coupled to the vehicle, said control circuit being electrically coupled to a power source comprising an electrical system of the vehicle, said control circuit being in electrical communication with the alarm system, each of said window sensors being electrically coupled to said control circuit, each of said handle sensors being electrically coupled to said control circuit, said control circuit receiving an alarm input when the alarm system of the vehicle is triggered;
- a signal analyzer being coupled to the vehicle, said signal analyzer being electrically coupled to said control circuit;
- a personal electronic device being carried by the owner of the vehicle, said personal electronic device being in remote communication with the extrinsic communication network; and
- a transceiver being coupled to the vehicle, said transceiver being electrically coupled to said control circuit, said transceiver being turned on when said control circuit receives said alarm input, said transceiver broadcasting said alert signal to said personal electronic device when said transceiver is turned on wherein said personal electronic device is configured to notify the owner of the vehicle to a potential theft;

a motion sensing array being coupled to the vehicle wherein said motion sensing array is configured to detect motion proximate the vehicle, said motion sensing array being in communication with the alarm system of the vehicle, said motion sensing array triggering the alarm system when said motion sensing array senses motion within a predetermined trigger distance of the vehicle wherein said motion sensing array is configured to deter a potential thief from attempting to forcibly enter the vehicle, said motion sensing array being electrically coupled to said control circuit, said motion sensing array communicating a motion signal to said control circuit, said motion sensing array increasing an intensity of said motion signal in inverse proportion to the distance between the potential thief and the vehicle once the potential thief moves within said predetermined trigger distance of the vehicle, said signal analyzer analyzing said motion signal communicated by said motion sensing array, said signal analyzer increasing an audible volume of the alert system in direct proportion to the intensity of said motion signal;

a surveillance unit being mounted to a rear view mirror of the vehicle thereby facilitating said surveillance unit to surveil a back seat of the vehicle wherein said surveillance unit is configured to monitor a child sitting in the back seat, said surveillance unit comprising:
- a housing having a front wall and a back wall, said back wall being bonded to the rear view mirror having said front wall facing the back seat;
- a video camera being coupled to said front wall wherein said video camera is configured to capture footage of the back seat;
- a surveillance transceiver being positioned in said housing, said surveillance transceiver being in remote communication with the personal electronic device wherein said surveillance transceiver is configured to broadcast the footage of the back seat to the owner of the vehicle; and
- a power supply being positioned in said housing, said power supply being electrically coupled to said video camera and said surveillance transceiver, said power supply comprising at least one battery.

* * * * *